US007415822B1

(12) United States Patent
Harber et al.

(10) Patent No.: US 7,415,822 B1
(45) Date of Patent: Aug. 26, 2008

(54) LOAD SENSE BOOST DEVICE

(75) Inventors: Neil V Harber, Holy Cross, IA (US); Darrell J Rowan, Dubuque, IA (US); Ryan M Lutze, Epworth, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/186,562

(22) Filed: Jul. 21, 2005

(51) Int. Cl.
*F16D 31/02* (2006.01)

(52) U.S. Cl. .......................................... 60/452; 60/413

(58) Field of Classification Search .................. 60/452, 60/413
See application file for complete search history.

(56) References Cited

U.S. PATENT DOCUMENTS 4,537,029 A * 8/1985 Gunda et al. .................. 60/452
5,513,958 A * 5/1996 Mientus ....................... 60/452
5,579,642 A * 12/1996 Wilke et al. ................... 60/452
6,644,429 B2 11/2003 Evans et al.
6,672,399 B2 1/2004 Sprinkle et al.
2002/0100639 A1 8/2002 Miller
2005/0072144 A1 4/2005 Bitter et al.
2006/0021338 A1 2/2006 Sprinkle et al.

OTHER PUBLICATIONS

John Deere, D Graders 672D, 772D, 872D, Six Wheel Drive; 2005; United States of America, 28 pgs.
John Deere, D Motor Grader 872D, Six Wheel Drive; 2005; United States of America, 6 pgs.
John Deere, 410G Backhoe Loader Load Sense Isolator, 1996, United States of America, 2 pgs.

* cited by examiner

*Primary Examiner*—F. Daniel Lopez
(74) *Attorney, Agent, or Firm*—Baker & Daniels LLP

(57) ABSTRACT

A vehicle is disclosed having a hydraulic system. The hydraulic system includes a pressure regulator that maintains the output pressure from a hydraulic pump above a predetermined minimum pressure.

22 Claims, 4 Drawing Sheets

LOAD SENSE BOOST DEVICE

BACKGROUND OF THE INVENTION

The present invention relates generally to hydraulic control systems. More particularly, the present invention relates to a hydraulic control system that maintains a reserve capacity for use by a hydraulic device.

BACKGROUND AND SUMMARY

Many pieces of construction equipment use hydraulics to control the functions performed by the equipment. For example, many pieces of construction equipment use hydraulics to control the brakes. If pressure is lost in the hydraulic system, it is important that the brakes continue to operate so that the operator can stop the piece of equipment.

According to one aspect of the present invention, a vehicle is provided including a frame, a plurality of traction devices configured to propel the frame on the ground, a plurality of hydraulic actuators, brakes configured to control the speed of the vehicle, and a hydraulic control system. The hydraulic control system includes a pressure source providing pressurized hydraulic fluid, a load sense system detecting the maximum pressure needed by the plurality of hydraulic actuators during operation of the vehicle, and a plurality of hydraulic controls controlling the supply of pressurized fluid to the plurality of hydraulic actuators. The plurality of hydraulic controls uses the maximum pressure detected by the load sense system to regulate the pressure of the hydraulic fluid provided to the plurality of hydraulic actuators. The hydraulic control system further includes a pressure source control coupled to the load sense system and pressure source to control the pressure output from the pressure source based on the maximum pressure detected by the load sense system, a load sense input to the load sense system that maintains the maximum pressure detected by the load sense system at least at a predetermined pressure, and a hydraulic fluid accumulator supplying pressurized fluid to the brakes.

According to another aspect of the present invention, a vehicle is provided including a frame, a plurality of traction devices configured to propel the frame on the ground, a plurality of hydraulic actuators, and a hydraulic control system. The hydraulic control system includes a hydraulic pump providing pressurized hydraulic fluid and a load sensor configured to detect the maximum pressure needed by the plurality of hydraulic actuators. The load sensor provides a signal indicative of the maximum pressure. The signal controls the pressure of the hydraulic fluid output from the hydraulic pump. The hydraulic control system further includes a plurality of pressure compensators provided for the plurality of hydraulic actuators. Each of the pressure compensators provides pressurized fluid to at least one corresponding hydraulic actuators based on the signal from the load sensor and the necessary load pressure from the corresponding hydraulic actuator. The hydraulic control system further includes a signal regulator maintaining the signal above a predetermined level.

According to another aspect of the present invention, a vehicle is provided including a frame, a plurality of traction devices configured to propel the frame on the ground, a plurality of hydraulic actuators, and a hydraulic control system. The hydraulic control system includes a pressure source providing pressurized hydraulic fluid, a plurality of hydraulic controls regulating the supply of pressurized fluid to the plurality of hydraulic actuators, a load sensor detecting the maximum pressure needed by the plurality of hydraulic actuators and providing a hydraulic signal indicative of the maximum pressure, a pump control receiving the hydraulic signal from the load sensor and controlling the output pressure from the source of pressurized fluid, and a load signal regulator maintaining the hydraulic signal above a predetermined level that is less than the output pressure of the source of pressurized fluid.

Additional features of the present invention will become apparent to those skilled in the art upon consideration of the following detailed description of the presently perceived best mode of carrying out the invention.

BRIEF DESCRIPTION OF THE DRAWINGS

The detailed description of the drawings particularly refers to the accompanying figures in which.

DETAILED DESCRIPTION OF THE DRAWINGS

Figure 1:
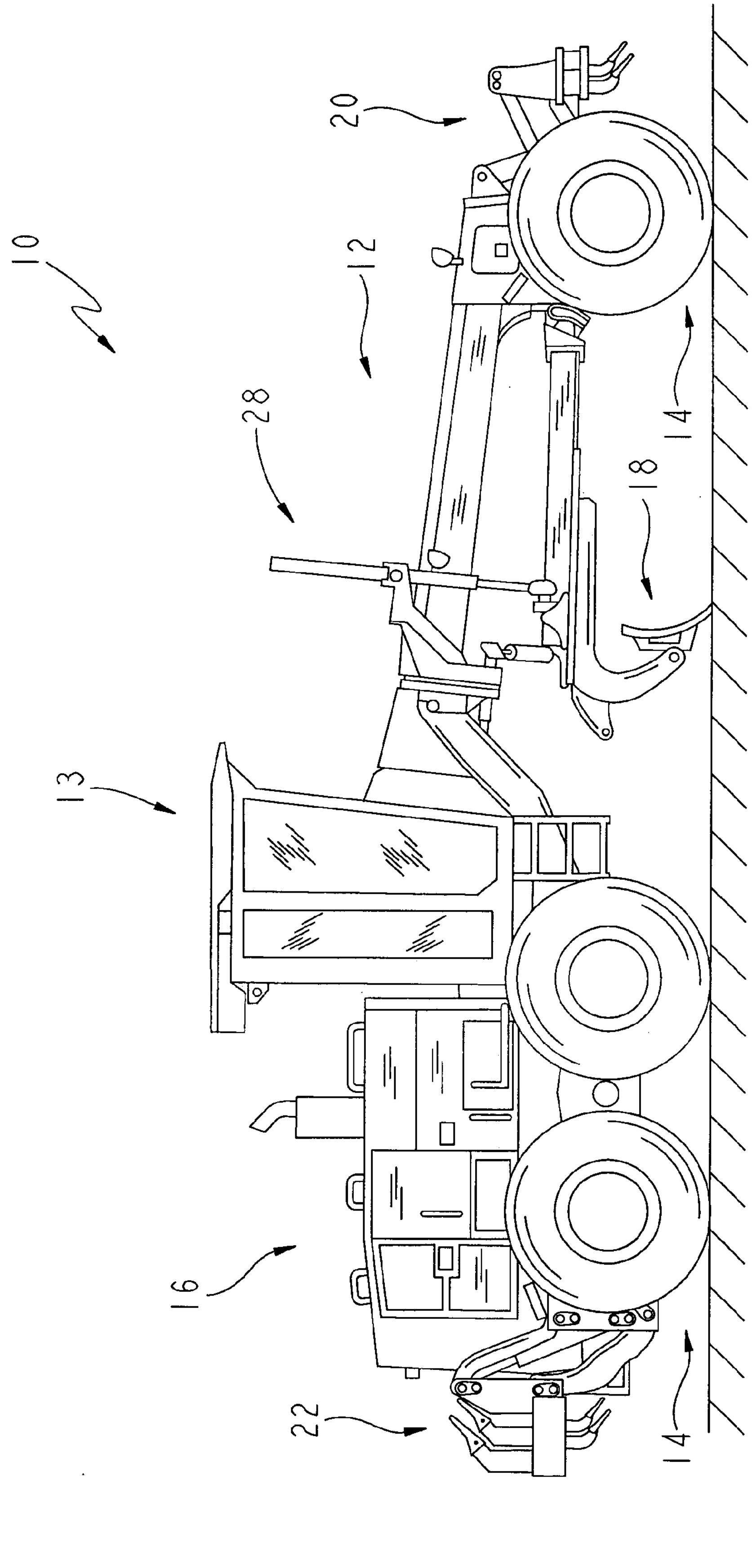
FIG. 1 is a side elevation view of a grader showing the grader including a frame, a cab supported by the frame, a blade extending below the frame, and a plurality of wheels supporting the frame on the ground.

A motor grader 10 is shown in FIG. 1 for spreading and leveling dirt, gravel, or other materials. Grader 10 includes an articulated frame 12, a passenger cab 13, an plurality of wheels 14 to propel frame 12 the remainder of grader 10 along the ground, an engine 16 to power operation of grader 10, and a blade 18 for spreading and leveling. In addition to blade 18, grader 10 is provided with a scarifier 20 and a ripper 22 for working the soil. Additional details of a suitable grader are provided in U.S. Pat. No. 6,644,429, titled Hydrostatic Auxiliary Drive System, to Evans et al., the disclosure of which is expressly incorporated by reference herein.

Figure 2:
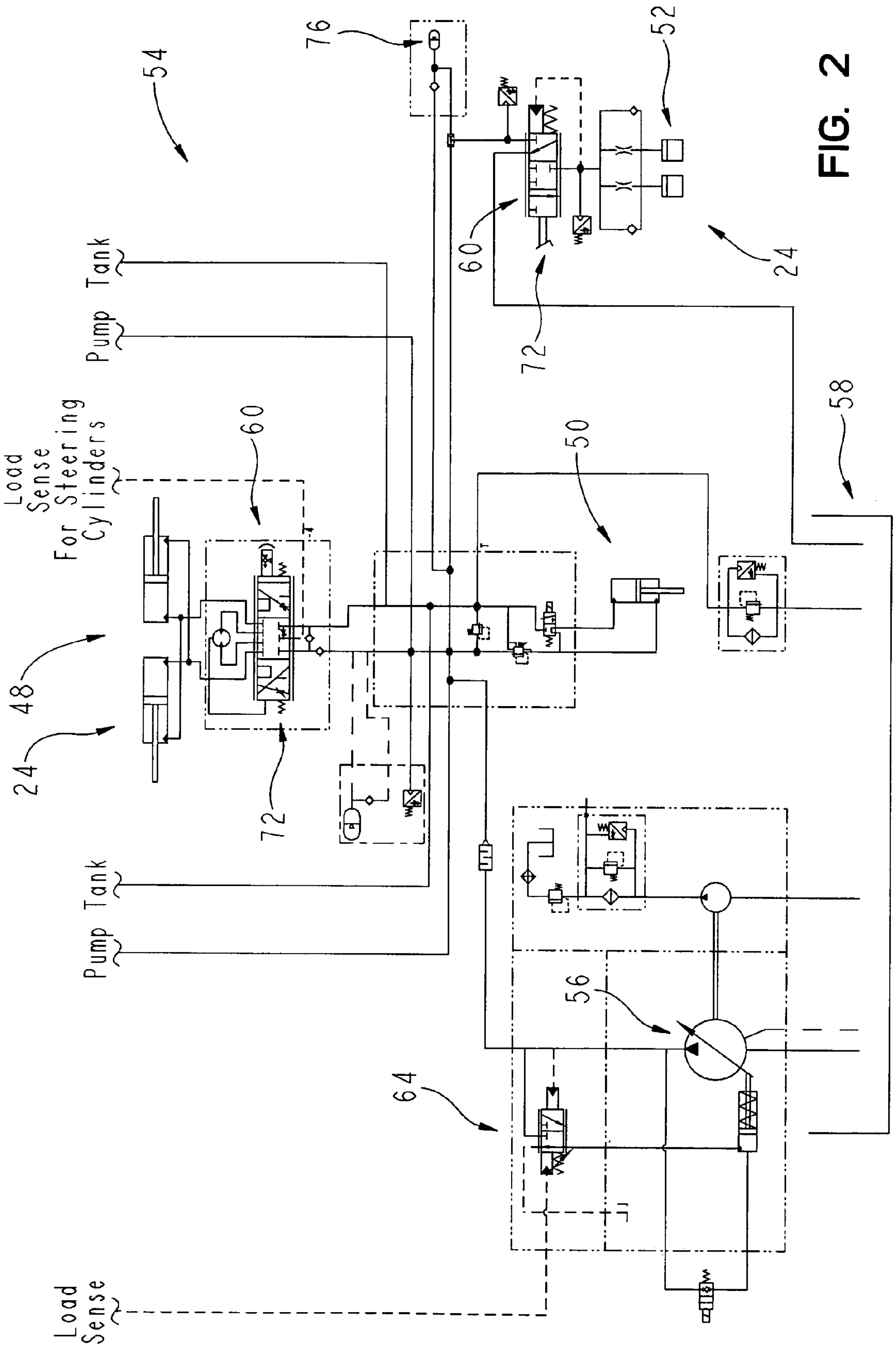
FIG. 2 is a schematic view of a portion of a hydraulic control system of the grader of FIG. 1 showing a pump drawing hydraulic fluid from a tank, a pair of steering cylinders, and a hydraulic brake system.
Figure 3:
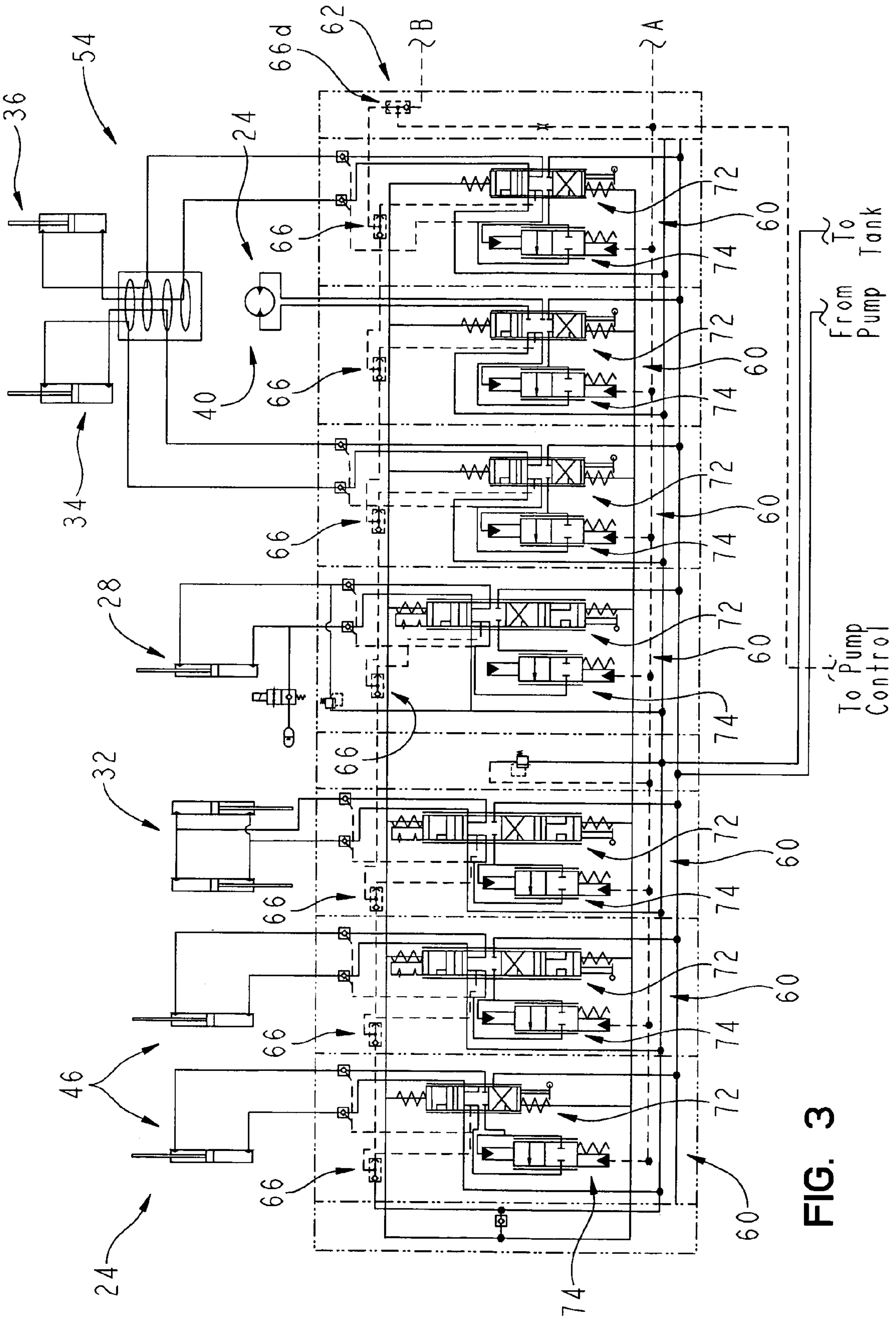
FIG. 3 is a schematic view of another portion of the hydraulic control system showing a left bank of hydraulic control valves and the hydraulic devices controlled by the control valves.
Figure 4:
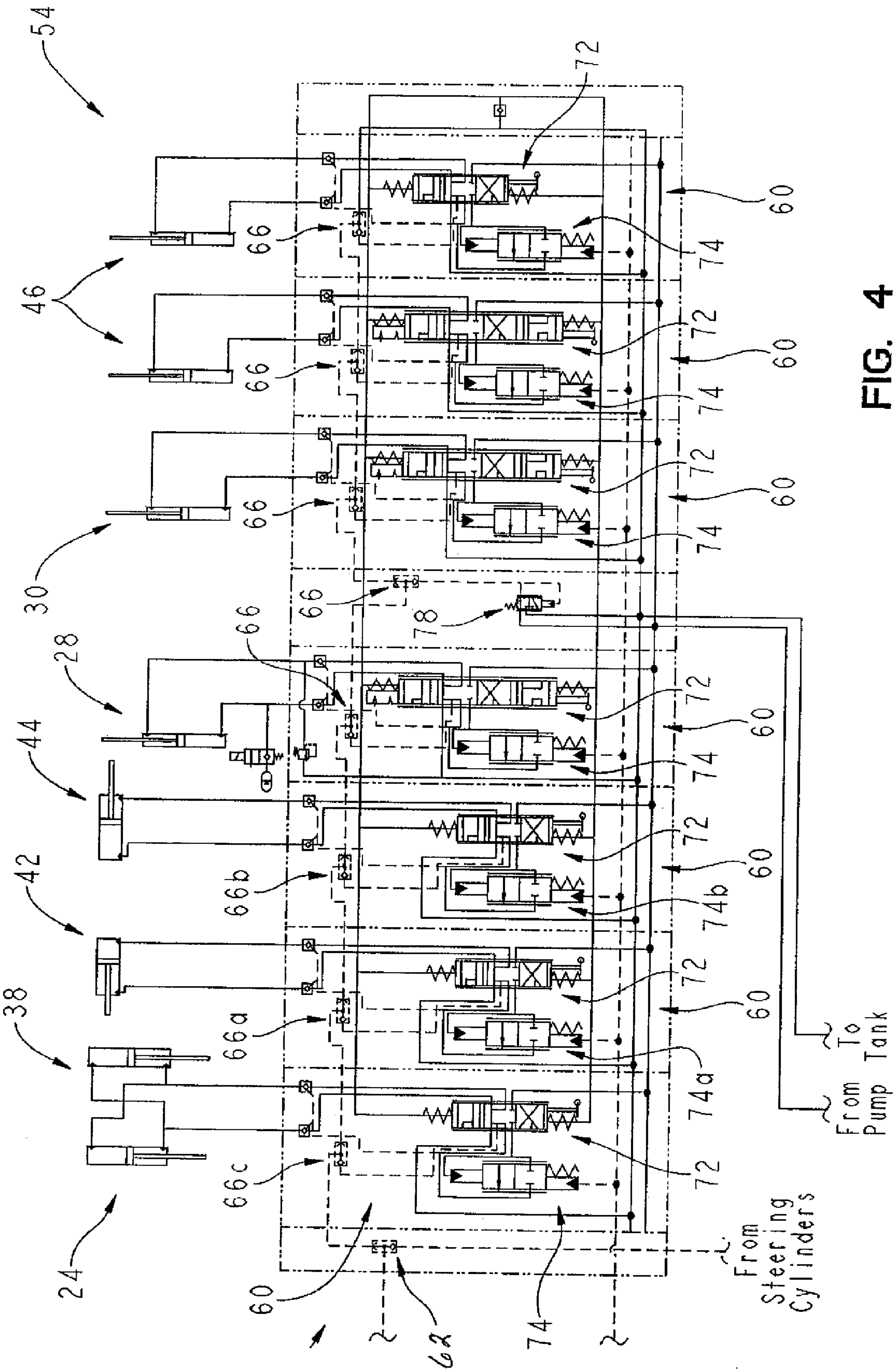
FIG. 4 is a schematic view of another portion of the hydraulic control system showing a right bank of hydraulic control valves and the hydraulic devices controlled by the control valves.

To move and power the various components of grader 10, it includes a plurality of hydraulic actuators 24. As shown in FIGS. 2-4, such actuators 24 include blade-lift cylinders 28 to raise and lower blade 18, scarifier cylinder 30 to raise and lower scarifier 20, ripper cylinders 32 to raise, lower, and operate ripper 22, a blade side shift cylinder 34 to shift blade 18 laterally, a blade tilt cylinder 36 to adjust the tilt of blade 18, articulation cylinders 38 to power articulation of frame 12, blade circle rotation motor 40 to permit rotation of blade 18 about a vertical axis, a circle side shift cylinder 42, a wheel lean cylinder 44 to control the tilt of front wheels 14 during turning, auxiliary cylinders 46 for optional features, steering cylinders 48 to control the direction of front wheels 14, saddle locking pin cylinder 50, and brake pistons 52 of the brakes to control the speed of grader 10.

To power and control hydraulic actuators 24, grader 10 includes a hydraulic control system 54 as shown in FIGS. 2-4. Hydraulic control system 54 includes a pressure source or hydraulic pump 56 that pressurizes the hydraulic fluid and a hydraulic fluid tank 58 that receives hydraulic fluid back from actuators 24. Hydraulic control system 54 also includes a plurality of hydraulic controls 60 that control the flow and pressure of hydraulic fluid provided to actuators 24.

Hydraulic control system 54 operates at a range of pressures depending on the needs of actuators 24. System 54 includes a load sensor or load sense system 62 that detects the maximum pressure required by actuators 24 and a pressure source control or pump control 64 that controls the output pressure from pump 56. Load sense system 62 sends a hydraulic signal to pump control 64 so that pump 56 provides enough pressure at any given time to operate the actuator 24 that needs the maximum pressure.

As shown in FIGS. 3 and 4, load sense system 62 includes a plurality of shuttle disks or comparators 66 that communicate with actuators 24 to determine their current pressure load or pressure need. Each comparator 66 includes a pair of inputs and an output. Typically, each comparator 66 receives a pressure signal from another comparator 66 and an actuator 24 through one of the plurality of controls 60. Each comparator 66 provides an output equal to the higher signal. As shown in FIG. 4, for example, comparator 66*a* receives a signal from circle side shift cylinder 42 and a signal from comparator 66*b* associated with wheel lean cylinder 44. If it is assumed that the pressure load need from circle side shift cylinder 42 is 1500 psi and the output signal pressure from wheel lean cylinder 44 is 1350 psi, comparator 66*b* will output a hydraulic signal of 1500 psi, the higher of the two signals, to comparator 66*c* associated with articulation cylinders 38.

Each actuator 24 has an associated comparator 66 and all comparators 66 are coupled together in series so that maximum pressure needed by the comparators 66 is determined. As shown in FIG. 3, comparator 66*d* is the last comparator 66 in the series of comparators 66. Comparator 66*d* provides a hydraulic signal to pump control 64 equal to the maximum pressure input to system 64. Based on the signal, pump control 64 adjusts the output pressure of pump 56 to provide sufficient pressure to operate the actuator 24 requiring the most pressure (circle side shift cylinder 42 in the example). Pump control 64 regulates pump 56 to provide an output pressure that is 400 psi greater than the hydraulic signal provided by comparator 66*d*. The 400 psi difference or system margin compensates for pressure losses between the output of pump 56 and the actuator requiring the most pressure.

Pump 56 provides hydraulic fluid at the maximum needed pressure to each of the hydraulic controls 60. Each hydraulic control 60 includes a spool valve 72 that regulates the flow rate and direction of flow of hydraulic fluid to each actuator 24 and a pressure compensator 74 that regulates the pressure of the hydraulic fluid supplied to each actuator 24. An operator controls the position of spool valves 72 using levers to control the flow rate and direction of flow of fluid to actuators 24. Pressure compensators 74 receive the hydraulic signal from comparator 66*d* that indicates the maximum pressure needed by actuators 24. Using this signal as a pilot signal and another pilot signal sent from the respective actuator 24 through spool valve 72, pressure compensators 74 provide hydraulic fluid back to spool valve 72 and the respective actuators 24 at the required pressure for each respective actuator 24. If an actuator 24 requires the maximum pressure indicated by the signal from comparator 66*d*, the respective compensator 74 provides that pressure. If an actuator 24 requires less than the maximum pressure, the respective compensator 74 provides a pressure drop that lowers the fluid pressure to the pressure required for the respective actuator 24.

For example, as described above, it was assumed that side shift cylinder 42 needed 1500 psi of pressure and wheel lean cylinder 44 needed 1350 psi of pressure. Assuming 1500 psi was the maximum pressure required for all actuators 24, hydraulic pump 56 would output 1900 psi (1500 psi+400 psi), compensator 74*a* associated with side shift cylinder 42 would provide no pressure drop (other than some inherent pressure drop), and compensator 74*b* associated with wheel lean cylinder 44 would provide 150 psi pressure drop. Because of the inherent pressure drops between pump 56 and side shift cylinder 42 (approximately 400 psi), 1500 psi of pressure is supplied to side shift cylinder 42 and 1350 psi of pressure is supplied to wheel lean cylinder 44. Thus, although one or more of actuators 24 is operating at the maximum needed pressure, other actuators 24 are operating at lower pressures because they do not require the higher maximum pressure.

As shown in FIG. 2, hydraulic system 54 also includes an accumulator 76 that supplies hydraulic fluid to brake pistons 52. Accumulator 76 receives pressurized fluid from pump 56 with little pressure loss. To actuate the brakes six times, accumulator 76 needs approximately 1300 psi of pressure. Thus, if sufficient pressure is unavailable from pump 56, brakes can be operated at least six times to bring grader 10 to a stop.

To maintain 1300 psi of pressure in accumulator 76, the outlet pressure of pump 56 is also normally maintained at 1300 psi. Because the necessary pressure required by actuators 24 may not always provide for 1300 psi of pressure, hydraulic control system 54 includes a load boost input or signal regulator 78, shown in FIG. 4, that maintains the minimum hydraulic signal from comparator 66*d* at 900 psi. As a result, pump control 64 maintains the normal output pressure from pump 56 at a minimum of 1300 psi.

As shown in FIG. 4, signal regulator 78 is preferably a pressure reducing valve having an output pressure of 900 psi. Under normal operating conditions, signal regulator 78 receives hydraulic fluid from pump 56 at a minimum of approximately 1300 psi. During operation of actuators 24, signal regulator 78 may receive hydraulic fluid from pump 56 up to 2,750 psi. Regardless of what pressure regulator 78 receives from pump 56 during normal operation, the pressure signal from regulator 78 is about 900 psi.

As shown in FIG. 4, this 900 psi pressure signal is feed into load sense system 62. Thus, load sense system 62 will always have at least one input providing a hydraulic pressure signal of at least 900 psi. Even if all actuators 24 require less than 900 psi, the output from comparator 66*d* to pump control 64 will be 900 psi and the output from pump 56 will be 1300 psi.

At startup and other times, it is possible that the pressure provided to signal regulator 78 will be below 900 psi. Assuming the pressure output from pump 56 is initially 0 psi, comparator 66*d* will also provide a signal to pump control 64 of 0 psi and pump control 64 will instruct pump 56 to have an output of 400 psi which is then provided to signal regulator 78. Signal regulator 78 will then provide a 400 psi signal to comparator 66*d* which is transmitted to pump control 64 to boost the output pressure of pump 56 to 800 psi. This feedback continues until the output pressure of pump 56 reaches 1300 psi to keep accumulator 76 or any other hydraulic device at the necessary pressure.

The control system above has been described in reference to a grader. According to other embodiments of the present disclosure, the control system may be provided on other vehicles such as articulated dump trucks, backhoe loaders, dozers, crawler loaders, excavators, skid steers, scrapers, trucks, cranes, or any other type of vehicles known to those of ordinary skill in the art. In addition to wheels, other types of traction devices may be provided on such vehicles such as tracks or other traction devices known to those of ordinary skill in the art.

Although the invention has been described in detail with reference to certain preferred embodiments, variations and modifications exist within the spirit and scope of the invention as described and defined in the following claims.

The invention claimed is:

1. A vehicle including a frame, a plurality of traction devices configured to propel the frame on the ground, a plurality of hydraulic actuators, brakes configured to control the speed of the vehicle, and a hydraulic control system including a pressure source providing pressurized hydraulic fluid, a load sense system detecting the maximum pressure needed by the plurality of hydraulic actuators during operation of the vehicle, a plurality of hydraulic controls controlling the supply of pressurized fluid to the plurality of hydraulic actuators, the plurality of hydraulic controls using the maximum pressure detected by the load sense system to regulate the pressure of the hydraulic fluid provided to the plurality of hydraulic actuators, a pressure source control coupled to the load sense system and pressure source to control the pressure output from the pressure source based on the maximum pressure detected by the load sense system, a load sense input to the load sense system that maintains the maximum pressure detected by the load sense system at least at a predetermined pressure, the hydraulic control system including a system margin substantially equal to pressure losses between the pressure source and at least one of the plurality of hydraulic actuators and the predetermined pressure being greater than the system margin, and a hydraulic fluid accumulator supplying pressurized fluid to the brakes, the predetermined pressure being sufficient to provide a charge for the hydraulic fluid accumulator sufficient for a predetermined number of applications of the brakes.

2. The vehicle of claim 1, wherein the load sense input is a hydraulic signal received from the load sense system.

3. The vehicle of claim 1, wherein the plurality of hydraulic controls include a compensator that provides pressurized fluid from the pressure source to a corresponding one of the plurality of hydraulic actuators at a pressure that matches the needs of the corresponding hydraulic actuator.

4. The vehicle of claim 1, wherein the predetermined pressure is less than the output of the pressure source of pressurized hydraulic fluid.

5. The vehicle of claim 1, wherein the load sense system receives an indication of the pressure requirements of the plurality of hydraulic actuators and compares the pressure requirements to determine the maximum pressure needed by the plurality of hydraulic actuators.

6. The vehicle of claim 5, wherein the load sense system compares the load sense input to pressure requirements of the plurality of hydraulic actuators.

7. The vehicle of claim 1, wherein the hydraulic fluid accumulator provides fluid to the brakes when sufficient pressurized fluid is unavailable from the pressure source.

8. A vehicle including a frame, a plurality of traction devices configured to propel the frame on the ground, a plurality of hydraulic actuators, and a hydraulic control system including a hydraulic pump providing pressurized hydraulic fluid, a load sensor configured to detect the maximum pressure needed by the plurality of hydraulic actuators, the load sensor providing a signal indicative of the maximum pressure, the signal in combination with a system margin controlling the pressure of the hydraulic fluid output from the hydraulic pump, a plurality of pressure compensators provided for the plurality of hydraulic actuators, each of the pressure compensators providing pressurized fluid to at least one corresponding hydraulic actuator based on the signal from the load sensor and the necessary load pressure from the corresponding hydraulic actuator, and a signal regulator maintaining the signal above a predetermined level that is substantially greater than the system margin.

9. The vehicle of claim 8, wherein the signal is hydraulic.

10. The vehicle of claim 9, further including brakes configured to control the speed of the vehicle, wherein the hydraulic control system includes a hydraulic fluid accumulator providing pressurized fluid to the brakes when sufficient pressurized fluid is unavailable from the hydraulic pump.

11. The vehicle of claim 10, wherein pressure of the hydraulic signal is less than the pressure of the hydraulic fluid normally provided to the accumulator by the hydraulic pump.

12. The vehicle of claim 8, wherein the hydraulic control system further includes a pump control that uses the signal to control the output pressure of the hydraulic pump, the signal is hydraulic and the output pressure of the hydraulic pump is greater than the hydraulic signal.

13. The vehicle of claim 12, wherein the difference between the pressure of the hydraulic signal and the output pressure of the pump is substantially equal to a pressure drop between the outlet of the hydraulic pump and the input pressure to the plurality of pressure compensators.

14. The vehicle of claim 8, wherein the plurality of pressure compensators provide pressurized fluid to the corresponding hydraulic actuators at different pressures.

15. The vehicle of claim 8, wherein the predetermined level maintains the pressure of the hydraulic fluid output from the hydraulic pump high enough to actuate at least one of the plurality of hydraulic actuators.

16. The vehicle of claim 15, wherein the load signal regulator is a pressure reducing valve.

17. The vehicle of claim 15, further including brakes configured to control the speed of the vehicle, wherein the hydraulic control system further includes an accumulator providing pressurized fluid to the brakes when sufficient pressurized fluid is unavailable from the hydraulic pump, the normal minimum pressure provided to the accumulator being enough to apply the brakes a predetermined number of times.

18. The vehicle of claim 15, wherein the plurality of pressure compensators receives the signal.

19. The vehicle of claim 15, wherein the plurality of pressure compensators provide hydraulic fluid to the plurality of hydraulic actuators at different pressures.

20. The vehicle of claim 15, wherein the hydraulic pump provides a pressure gain at least equal to a pressure drop in the hydraulic control system.

21. The vehicle of claim 15, further including a braking system and a hydraulic accumulator adapted to provide pressurized hydraulic fluid to the braking system if hydraulic fluid from the hydraulic pump is unavailable, wherein the at least one of the plurality of hydraulic actuators is an actuator for actuation of the brakes configured to one of stopping and slowing the vehicle.

22. The vehicle of claim 8, further including a hydraulic fluid accumulator adapted to provide pressurized fluid to a brake system of the vehicle, the predetermined level configured to maintain a sufficient pressure of hydraulic fluid in the hydraulic accumulator to one of stop and slow the vehicle when hydraulic fluid is unavailable from the hydraulic pump.

* * * * *